UNITED STATES PATENT OFFICE.

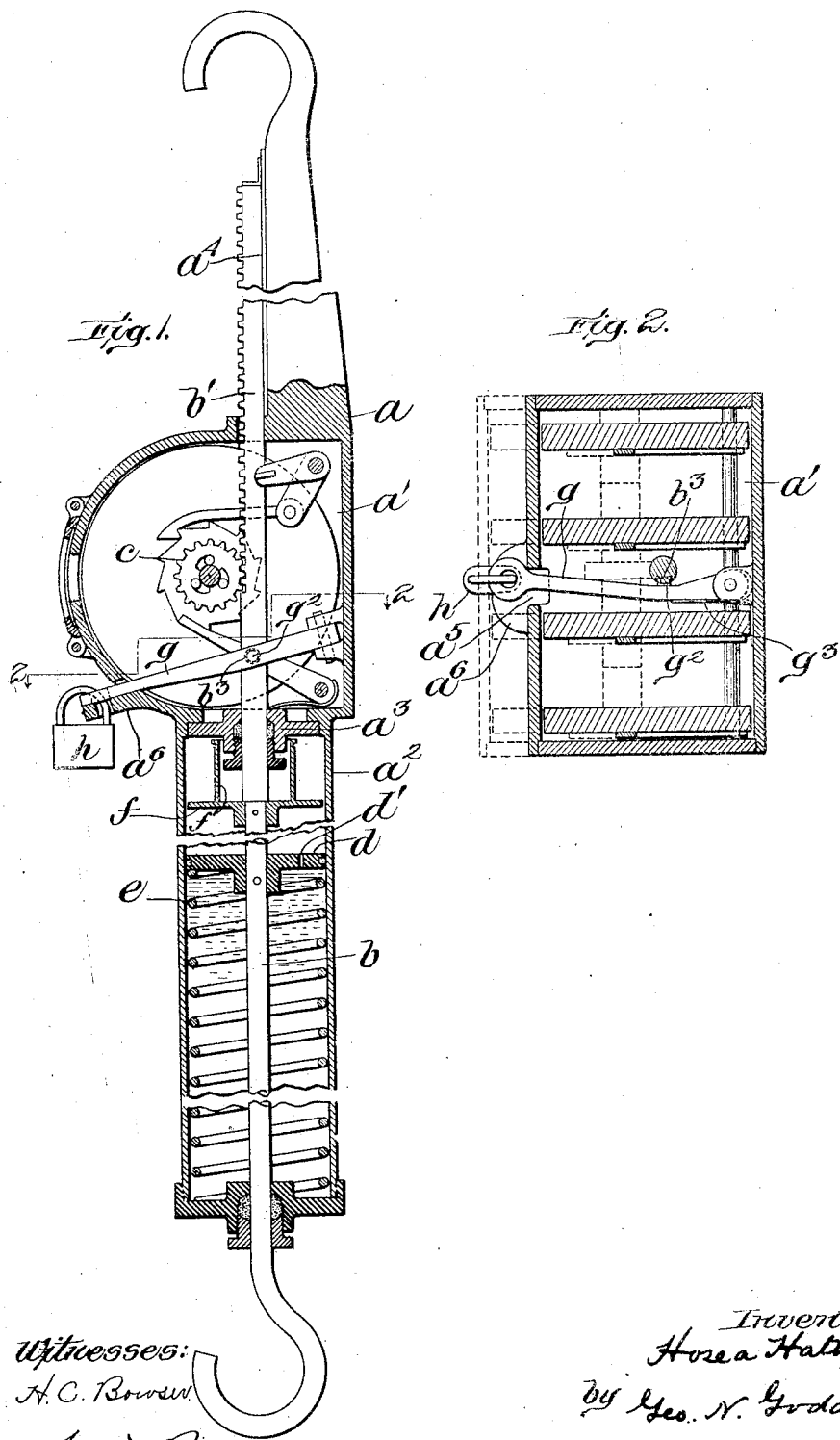

HOSEA HATHAWAY, OF BOSTON, MASSACHUSETTS.

WEIGHING AND ADDING SCALE.

1,079,336.

Specification of Letters Patent.

Patented Nov. 25, 1913.

Application filed November 11, 1908. Serial No. 462,045.

*To all whom it may concern:*

Be it known that I, HOSEA HATHAWAY, citizen of the United States, and resident of Boston, county of Suffolk, Massachusetts, have invented certain new and useful Improvements in Weighing and Adding Scales, of which the following is a specification.

This invention relates to weighing and adding scales of the type shown and described in Letters Patent of the United States issued to me June 6, 1905 No. 791,554.

The present improvements consist first in the construction and arrangement by which tampering with the register or scale when the same is not in use may be prevented.

A second feature of the invention consists in the construction and arrangement by which the momentum of the weight when applied to the draft rod of the scale is checked so as to prevent excess registering of the recorder.

In the accompanying drawings I have illustrated the preferred form of embodying my aforesaid improvements.

Figure 1 is a side elevation in central section showing the complete scale containing these improvements. Fig. 2 is a cross section on the plane indicated by broken line 2—2 of Fig. 1.

In the practice of my invention I employ an elongated framework or casing $a$ embracing a chamber $a'$ for inclosing the registering mechanism of a cylinder $a^2$ which is formed at top and bottom with bearings or stuffing boxes $a^3$ which form closely fitting bearings for the draft rod $b$. In this case the draft rod is made integral with the slide bar which engages and actuates the recording mechanism. It comprises an elongated bar or rod, the upper portion $b'$ of which is in the form of a rack bar having teeth to engage a pinion $c$ which operates the recording mechanism in the manner described in my aforesaid patent. At its lower end the draft rod terminates in a supporting hook for carrying the load to be weighed, the lower half of the rod where it passes through the stuffing boxes $a^3$ being of cylindrical cross section. Inside of the cylindrical chamber $a^2$ is placed a piston $d$ which is secured to the draft rod.

As the present construction is more particularly designed for use with a liquid or oil check, I provide a suitable passage for permitting the flow of the liquid from the under to the upper side of the piston $d$, such passage being formed in any suitable manner as by perforating the piston as illustrated at $d'$. A spiral spring $e$ of the compression type is employed for the purpose of affording resistance to the weight on the draft rod so that the descent of the draft rod will be proportioned to the weight suspended thereon at each weighing operation. Normally the draft rod will be in the position indicated in Fig. 1, while the weight of each object put on the scale will be indicated by the descent of the rack bar along the vertical scale $a^4$ arranged as in my aforesaid Letters Patent.

Inasmuch as the compression spring $e$ after its compression during the weighing operation, causes the draft rod to rise again to its normal position when the weight is removed, I have devised means for preventing the oil from coming in contact with that portion of the draft rod which moves through the upper bearing into the interior of the cylindrical oil chamber. This device consists of a disk-like member or head $f$ secured to the draft rod at a proper distance above the piston $d$. This head need not fit tightly against the interior of the cylinder since it is desirable to avoid any air compression or exhaustion in the upper end of the chamber. The head may be provided with a vertical annular wall $f'$ as a further means of protecting that portion of the draft rod above the head $f$ from the oil. The wall $f'$ is also provided with an annular groove to prevent the seeping of oil over the upper edge of the wall.

It should be borne in mind that these scales are often carried on wagons where the shaking would cause the oil to splash upward against the exposed portion of the draft rod which moves through the upper bearing or stuffing box. I have also devised means for retaining or locking the draft rod in its normal position when the device is not in actual use. This retaining means in this case is shown as consisting of a lever $g$ pivotally connected with the rear wall of the casing $a'$ and projecting through a slot $a^5$ formed in the front wall of said casing. The lever $g$ is constructed so as to form a locking engagement with the draft rod $b$, this being accomplished by providing the lever $g$ with a lateral lug or projection $g^2$ which engages or projects into a recess $b^3$ formed in the draft rod. As a further precaution I have provided means for fastening the lever $g$ against movement, this means consisting in this case of a padlock $h$ whose hasp passes through a hole formed in a projecting lug $a^6$ on the casing and through a corresponding hole in the forward end of the lever $g$ so that with the padlock in place the lever cannot be moved out of its interlocking position. To press the lever $g$ normally into engagement with the draft rod, I provide a suitable spring, as shown at $g^2$, which is secured to the wall of the casing and presses against the lever $g$ with a yielding pressure.

The registering mechanism has not been specifically described because any suitable form of registering mechanism may be employed, such as that shown in my aforesaid Letters Patent.

What I claim is:—

1. In a weighing scale the combination of a casing forming an oil chamber whose upper and lower ends are provided with stuffing boxes, a draft rod for supporting the object to be weighed, said draft rod being passed through said stuffing boxes and having reciprocating movement therein, a head or piston secured to said draft rod intermediate of the stuffing boxes to resist the downward movement of the draft rod by pressure against the oil in the casing, a spring immersed in the oil and arranged to form a yielding resistance to the downward movement of the draft rod, and a weight-indicating scale, connected with said draft rod, substantially as described.

2. In a weighing scale the combination of an oil tight casing provided with upper and lower stuffing boxes, a reciprocating draft rod passing through the casing and projecting through said stuffing boxes, an indicator coöperating with the draft rod to indicate the weight of the object, a compression spring immersed in the oil of the chamber and arranged to oppose a yielding resistance to the downward movement of the draft rod, substantially as described.

3. In a weighing scale the combination of a draft rod for supporting the object to be weighed, a compression spring for resisting the pull of said weight, adding mechanism having direct engagement with said rack bar to add the successive weights, an interlocking lever engaging said draft rod to hold it against movement, and means for positively locking said lever against disengagement with said draft rod, substantially as described.

4. In a weighing scale the combination of a supporting casing, a vertically movable draft rod mounted therein, a spring carried by the casing and having engagement with the draft rod to afford a yielding resistance to its downward movement, a weighing and adding mechanism actuated by said draft rod, an interlocking lever having engagement with said draft rod to prevent its movement, and means for locking said lever against disengagement with said locking means embracing a lug formed on the casing, and means for securing said lever to said lug, substantially as described.

5. A weighing scale embracing in its construction a hollow casing, recording mechanism mounted therein, a cylindrical chamber formed below said casing and provided at its upper and lower ends with stuffing boxes, a draft rod passing through said stuffing boxes and having engagement with the weighing and adding mechanism, a piston secured to the draft rod intermediate of the ends of the cylinder, an oil passage being provided for permitting the flow of oil from one side to the other of said piston, and a spring for resisting the downward movement of the draft rod, substantially as described.

6. In a weighing scale the combination of recording mechanism, a casing for containing the same, a cylindrical oil chamber arranged beneath said casing, a draft rod passing through bearings formed in the upper and lower ends of said oil chamber and having engagement with the weighing mechanism, a piston secured to said draft rod inside the chamber, means located above the piston and within the chamber to prevent contact of the oil with the draft rod adjacent to the upper stuffing box, substantially as described.

7. In a weighing scale the combination of recording mechanism, a draft rod, a cylindrical chamber inclosing said draft rod provided with bearings at its upper and lower ends to form a close bearing for said draft rod, a perforated piston secured to the draft rod within the cylindrical chamber, and a supplemental head secured to the draft rod above the piston to prevent contact of the oil with that portion of the draft rod lying in the upper end of the chamber, substantially as described.

In witness whereof, I have subscribed the above specification.

HOSEA HATHAWAY.

In the presence of—
GEO. N. GODDARD,
KATHARINE A. DUGAN.